(No Model.)

J. H. H. DUNCAN.
CHURN.

No. 517,817. Patented Apr. 3, 1894.

Witnesses
Inventor
John Henry Hill Duncan
per O. E. Duffy Atty.

THE NATIONAL LITHOGRAPHING COMPANY,
WASHINGTON, D. C.

UNITED STATES PATENT OFFICE.

JOHN HENRY HILL DUNCAN, OF LONDON, ENGLAND, ASSIGNOR TO THE DISC CHURN COMPANY, LIMITED, OF SAME PLACE.

CHURN.

SPECIFICATION forming part of Letters Patent No. 517,817, dated April 3, 1894.

Application filed February 26, 1892. Serial No. 422,861. (No model.) Patented in Germany October 14, 1891, No. 65,025; in England December 1, 1891, No. 20,989; in France February 24, 1892, No. 21,964; in Belgium February 24, 1892, No. 98,499; in Norway July 20, 1892, No. 2,655; in Austria-Hungary October 29, 1892, No. 12,455; in Sweden November 3, 1892, No. 4,049, and in Canada July 12, 1893, No. 43,591.

*To all whom it may concern:*

Be it known that I, JOHN HENRY HILL DUNCAN, a subject of the Queen of Great Britain and Ireland, residing at Coleman Street, in the city of London, England, have invented a new and useful Improvement in Churns or Apparatus for the Manufacture or Production of Butter, (for which I have obtained Letters Patent in Great Britain, No. 20,989, dated December 1, 1891; in Germany, patent of addition, No. 69,058, dated December 13, 1891, to German Patent No. 65,025, dated October 14, 1891; in France, No. 21,964, dated February 24, 1892; in Belgium, No. 98,499, dated February 24, 1892; in Austria-Hungary, No. 12,455, dated October 29, 1892; in Canada, No. 43,591, dated July 12, 1893; in Norway, No. 2,655, dated July 20, 1892, and in Sweden, No. 4,049, dated November 3, 1892,) of which the following is a specification.

This invention has reference to the manufacture or production of butter by subjecting cream or milk (hereinafter referred to as cream) to the action of a rotary or oscillating disk or disks, or equivalent device or devices adapted to pick up the cream in the form of films, thin layers or sheets. Various means can be employed for effecting this object. Thus the cream in a ripened condition, can be placed in a vessel provided with one or more rotary or oscillating disks, plates, drums or parts (hereinafter referred to as a disk or disks) and with means, as for example a hot water jacket or coils, for regulating the temperature of the cream and for maintaining it at any desired temperature, the arrangement being such that while the disks (or each of them if more than one be used), is (or are) rotated or oscillated, part thereof will become coated with and will thus pick up a thin film of cream. The vessel may be uncovered or covered. The disk or each of them if more than one be used, may advantageously be provided with a guard.

Figure 1:
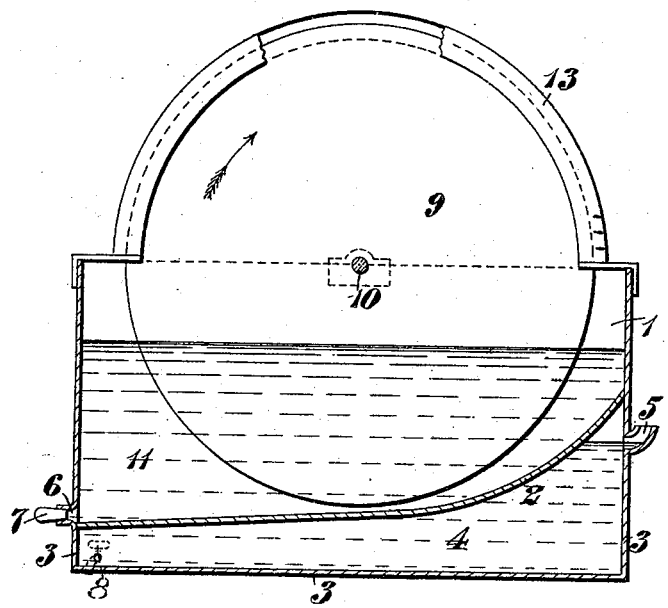
Figures 2, 3, 4:
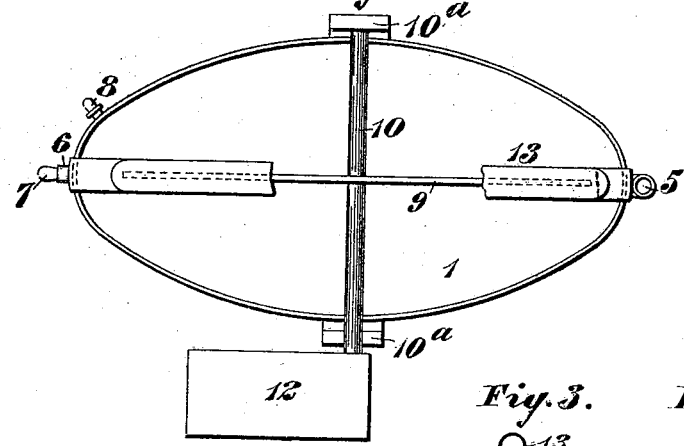

In the accompanying drawings, Figure 1 is a vertical section partly in elevation; and Fig. 2 a plan of one form of apparatus suitable for carrying out my invention. Figs. 3 and 4 are detail sectional views.

The apparatus illustrated in Figs. 1 and 2 comprises a vessel 1, that may advantageously be of oval or elliptical shape in plan, as shown, to receive the cream to be converted into butter. It is provided with an inclined or curved false bottom 2 which, in conjunction with the sides and bottom 3 of the vessel, forms a jacket or chamber 4 into which hot water or other fluid can be admitted when necessary by an inlet 5.

6 is an outlet normally closed by a plug 7, whereby the liquid contents of the vessel 1 can be drawn off when desired.

8 is a valve for drawing off the water or other fluid from the jacket or chamber 4.

9 is a disk of suitable material such as metal or wood; it is fixed on a shaft 10 mounted in bearings $10^a$ so that the disk can rotate partly within the cream 11 in the vessel 1. The shaft may be provided with any suitable means for imparting rotary or oscillatory motion thereto. Thus it may be provided with a crank handle so that it may be driven by hand; I prefer however to employ a spring or clockwork motor 12 of any suitable construction whereby the shaft may be driven automatically.

13 is a guard arranged concentrically with the disk 9 and carried by the vessel 1. This guard, which may be of sheet metal, is of a concavo-convex form in cross section, it may be for examples approximately semi-circular as shown in Fig. 3, or semi-hexagonal as shown in Fig. 4. It is arranged with its concave side toward the disk 9 so as to insure return to the vessel 1 in which the disk works of all cream thrown outward by centrifugal action.

The operation is as follows:—The cream at a suitable temperature, say at about 75° Fahrenheit when no guard such as 13 is used, or at about 60° Fahrenheit when the guard is used, is placed in the vessel 1, and the disk or disks 9 rotated in the direction of the arrow *a*. The speed of the disk may at commencement be such as to throw the cream into the concentric guard or guards 13 by centrifugal action with more or less force according to the state of ripeness the said cream has attained, but the speed may be diminished as the butter begins to form. By this means the cream will be caused to circulate and the disk or disks will be constantly coated with cream in a thin film layer or sheet. When the cream is converted into butter the disk is stopped and the butter washed and treated in the ordinary manner. The time required for the conversion to take place will depend upon the ripeness of the cream, that is to say upon the length of time it has been allowed to stand before treating it in the manner described. To bring the cream to the churning temperature, or should the temperature of the cream, while churning, fall below about 60° Fahrenheit or 75° Fahrenheit, according as the guard is or is not used, hot water may advantageously be poured into the jacket 4 to raise the cream to the temperature mentioned. Sometimes as for example when the cream is very ripe, or when the guard is used, the conversion will take place so quickly that the cream will not fall much below the desired temperature. Under these circumstances there will be no need to introduce hot water to the jacket 4. With cream four days old and at a temperature of 75° Fahrenheit, and using a metal disk about fourteen inches in diameter and revolving at a speed of about sixty revolutions per minute, the guard being omitted, I have effected the conversion of the cream into butter in thirty minutes and sometimes less. When a guard is used, and the disk revolved at say one hundred and twenty revolutions per minute to commence with, the cream, at a temperature of say about 60° Fahrenheit, can be converted into butter in about twenty minutes. When churning at low temperatures that is to say, at about 60° Fahrenheit, I find that the cream at first assumes the condition of stiff whipped cream, and that before butter is formed therefrom, it is necessary, either to increase the speed of the disk considerably or to add a little water at about the same temperature as the cream. It will usually be advantageous to ripen the cream to be used as this improves the flavor of the butter and lessens the time necessary for churning.

What I claim is—

1. In a churn or apparatus for making butter, a rotary body of disk form arranged to rotate in its own plane and partly within the cream to be treated so as to pick up and throw off the cream by centrifugal force, a receptacle to contain the cream, and an obstructing body arranged opposite the periphery of the said rotary body and against which said cream will be thrown, as set forth.

2. A churn or apparatus for making butter comprising a stationary vessel open at the top, a disk mounted to rotate in said vessel, and a fixed guard of concave or trough shape form in cross section arranged to partly surround said disk substantially as herein described for the purpose specified.

3. Apparatus for making butter, comprising a vessel 1 having at its lower side a jacket 4 provided with inlet and outlet openings for fluid, a disk 1 mounted to rotate in said vessel, and a fixed guard 13 of concavo-convex form in cross section arranged externally to and concentric with said disk substantially as herein described for the purpose specified.

In testimony whereof I have signed my name to this specification in the presence of two subscribing witnesses.

JOHN HENRY HILL DUNCAN.

Witnesses:
JOHN ALEXANDER CAMPBELL,
HERBERT STRANGMAN.